United States Patent
Namdar

(10) Patent No.: US 9,830,746 B2
(45) Date of Patent: *Nov. 28, 2017

(54) METHOD FOR CHARGING LOCATION USAGES

(71) Applicant: Kapsch TrafficCom AG, Vienna (AT)

(72) Inventor: Nader Namdar, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 875 days.

This patent is subject to a terminal disclaimer.

(21) Appl. No.: 14/158,949

(22) Filed: Jan. 20, 2014

(65) Prior Publication Data

US 2014/0207539 A1 Jul. 24, 2014

(30) Foreign Application Priority Data

Jan. 21, 2013 (EP) .................................. 13152084

(51) Int. Cl.
*G07B 15/06* (2011.01)
*G06Q 20/02* (2012.01)
(Continued)

(52) U.S. Cl.
CPC ............. *G07B 15/06* (2013.01); *G06Q 20/02* (2013.01); *G06Q 20/04* (2013.01); *G06Q 20/10* (2013.01);
(Continued)

(58) Field of Classification Search
CPC .......... G08G 1/10; G07B 15/06; G06Q 40/00; G06Q 20/00; G06Q 20/02; G06Q 20/04;
(Continued)

(56) References Cited

U.S. PATENT DOCUMENTS 5,101,200 A * 3/1992 Swett ................. G06Q 30/0284
235/437
5,544,086 A * 8/1996 Davis ..................... G06Q 20/02
705/43
(Continued)

FOREIGN PATENT DOCUMENTS

EP 1182625 A1 2/2002
EP 2511868 A1 10/2012
(Continued)

OTHER PUBLICATIONS

Toll Authorities Toss Coins in Favor of Prepayment Systems. (1992). POS News, N/A. Retrieved from https://dialog.proquest.com/professional/professional/docview/670854984?accountid=142257 on Aug. 21, 2017.*
(Continued)

*Primary Examiner* — Kito R Robinson
(74) *Attorney, Agent, or Firm* — Fiala & Weaver P.L.L.C.

(57) ABSTRACT

Methods are described for charging fees in a road toll system. An on-board unit identification is input into a toll terminal to generate a transaction identification. The transaction identification is transmitted to a transaction server, and from the server to a transaction terminal. A payment card identification is input into the transaction terminal, and is transmitted with the transaction identification to the server. A substitute identification, generated in the transaction server and associated with the card identification, and the transaction identification are transmitted from the transaction server to the toll terminal. The on-board unit identification and substitute identification, associated by the transaction identification, are transmitted from the toll terminal to a toll server. The substitute identification is used in a communication between the toll server and the transaction server for charging a fee for a location usage determined in
(Continued)

Figure 1:
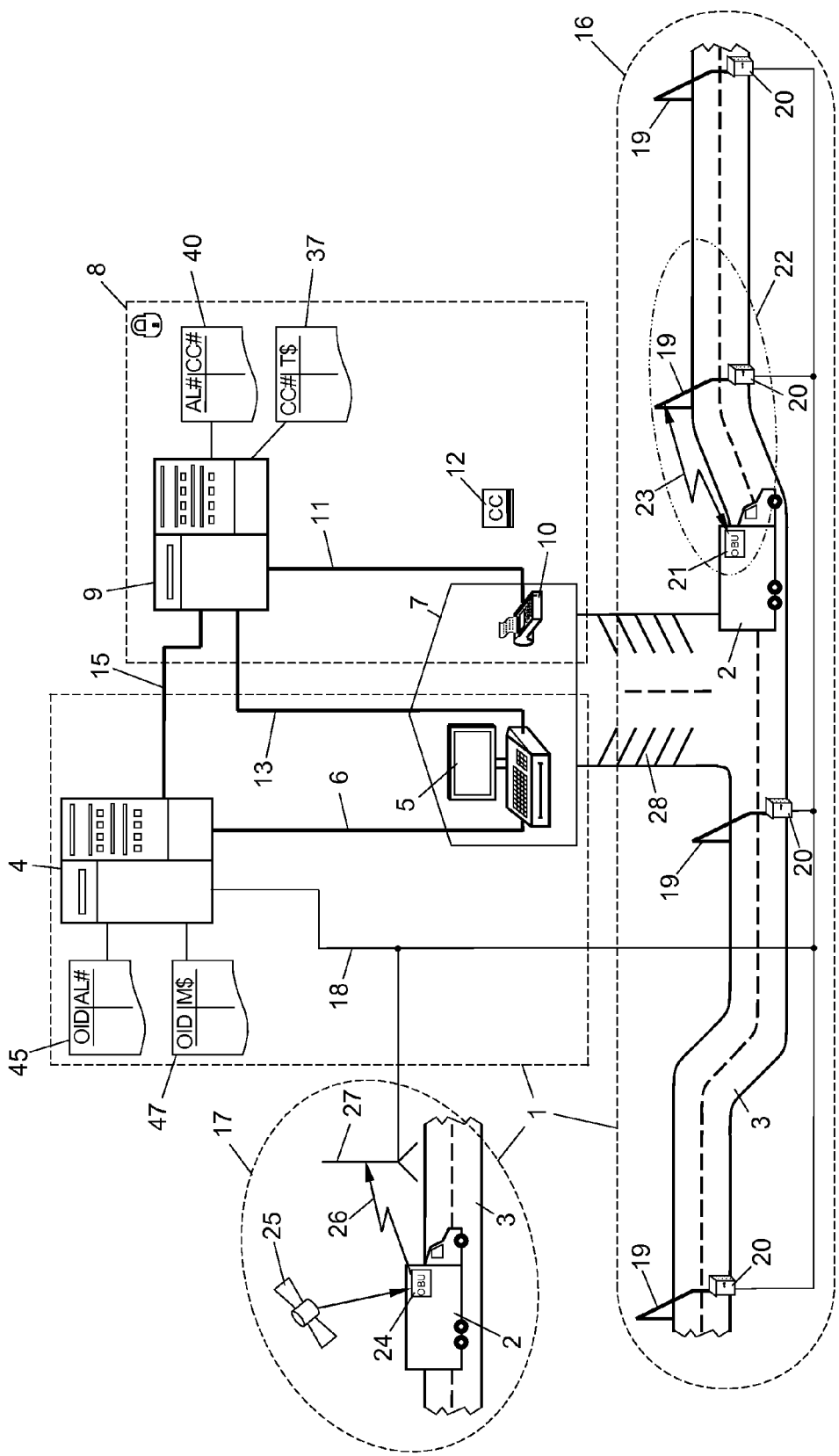

the road toll system under the respective on-board unit identification.

8 Claims, 2 Drawing Sheets

(51) Int. Cl.
 *G06Q 20/04* (2012.01)
 *G06Q 20/10* (2012.01)
 *G06Q 30/06* (2012.01)
 *G06Q 20/14* (2012.01)
(52) U.S. Cl.
 CPC ....... *G06Q 20/145* (2013.01); *G06Q 30/0639* (2013.01)
(58) Field of Classification Search
 CPC ... G06Q 20/10; G06Q 20/145; G06Q 30/0639
 USPC .............. 235/384; 705/13, 35, 74; 340/928; 455/420
 See application file for complete search history.

(56) References Cited

U.S. PATENT DOCUMENTS

| | | | | |
|---|---|---|---|---|
| 5,748,737 A * | 5/1998 | Daggar | ................ | G06K 7/0021 235/379 |
| 5,828,044 A * | 10/1998 | Jun | ................ | G06K 7/0008 235/380 |
| 6,003,014 A * | 12/1999 | Lee | ................ | G06Q 20/105 705/13 |
| 6,263,316 B1 * | 7/2001 | Khan | ................ | G06Q 20/105 186/35 |
| 6,653,946 B1 * | 11/2003 | Hassett | ................ | G01S 13/765 235/384 |
| 7,210,620 B2 | 5/2007 | Jones | | |
| 8,615,424 B2 * | 12/2013 | Kim | ................ | G06Q 20/40 705/13 |
| 8,688,510 B2 * | 4/2014 | Namdar | ................ | G06Q 20/403 705/13 |
| 8,751,391 B2 * | 6/2014 | Freund | ................ | G06Q 20/10 705/35 |
| 9,706,354 B2 * | 7/2017 | Enriquez | ................ | H04W 4/021 |
| 2002/0152178 A1 * | 10/2002 | Lee | ................ | G06Q 20/04 705/67 |
| 2002/0194137 A1 * | 12/2002 | Park | ................ | G06Q 20/382 705/64 |
| 2003/0001755 A1 * | 1/2003 | Tiernay | ................ | G07B 15/063 340/928 |
| 2005/0086164 A1 | 4/2005 | Kim et al. | | |
| 2007/0061256 A1 * | 3/2007 | Park | ................ | G06Q 20/10 705/40 |
| 2007/0164102 A1 | 7/2007 | Haertel | | |
| 2008/0147564 A1 | 6/2008 | Singhal | | |
| 2008/0189186 A1 | 8/2008 | Choi et al. | | |
| 2008/0204278 A1 * | 8/2008 | Tsuzuki | ................ | G07B 15/063 340/928 |
| 2009/0132813 A1 * | 5/2009 | Schibuk | ................ | G06Q 20/223 713/158 |
| 2009/0182675 A1 | 7/2009 | Brody | | |
| 2011/0282717 A1 * | 11/2011 | Aschenbrenner | .... | G07B 15/063 705/13 |
| 2012/0150727 A1 * | 6/2012 | Nuzzi | ................ | G06Q 20/10 705/39 |
| 2012/0330769 A1 * | 12/2012 | Arceo | ................ | G06Q 20/4014 705/21 |

FOREIGN PATENT DOCUMENTS

| | | | | |
|---|---|---|---|---|
| WO | | 98/40809 A2 | 9/1998 | |
| WO | | 03/075192 A1 | 9/2003 | |
| WO | WO 2007144708 | * | 12/2007 | ............ G06Q 20/00 |
| WO | WO 2013044286 | * | 4/2013 | ............ G06Q 40/00 |

OTHER PUBLICATIONS

Smart cards begin to take a highway toll. (1995). Debit Card News, 1(11), N/A. Retrieved from https://dialog.proquest.com/professional/professional/docview/681842624?accountid=142257 on Aug. 21, 2017.*
European Examination Report for EP Patent Application No. 13152084.3, dated Jan. 5, 2015, 5 pages.
Examination Report received for European Patent Application No. 131520843, dated Nov. 23, 2015, 6 pages.
Extended European Search Report received for EP Patent No. 13152084.3, dated May 28, 2013, 7 pages.

* cited by examiner

METHOD FOR CHARGING LOCATION USAGES

CROSS-REFERENCE TO RELATED APPLICATION(S)

This application claims priority to European Patent Application No. 13 152 084.3, filed on Jan. 21, 2013, the entirety of which is incorporated by reference herein.

BACKGROUND

Technical Field

The present application relates to a method for charging fees for location usages of on-board units in a road toll system.

Background Art

Location usages by vehicles are determined in electronic road toll systems with the aid of on-board units (OBUs) carried in the vehicles, which for this purpose communicate either via dedicated short range communication (DSRC) with geographically distributed radio beacons (DSRC beacons), or with the aid of global navigation satellite system (GNSS) OBUs, which are self-locating in a global navigation satellite system (GNSS). Whereas in DSRC systems the beacons are directly connected to the toll control centre, GNSS OBUs transmit the determined data to the central toll server generally via mobile radio.

In road toll systems of this type, the fees are charged, for example in accordance with US 2005/010478 A1, usually by pre-payment of a sum of money, which may additionally include a security deposit for the on-board unit. When an on-board unit is returned, for example at the toll terminal of a decentralised point of sales before crossing a border, the toll server calculates the sums of money paid up to that point and the credit used. Waiting times and undesirable cash reserves or complicated (international) bank transfers at the respective point of sales are associated with this approach.

In order improve the high effort and low flexibility of such a method for charging fees, a method was disclosed in European Patent Application No. EP 2 511 868, in which payment cards, for example credit cards, are used to determine, pay for, adjust payment of, and charge transaction values. In this method, the road toll system and payment transaction system cooperate without mutual integration, with the result that an inclusion of the road toll system into the highly elaborate secured processes of the payment card transactions and an associated certification of the road toll system for observance of fixed standards, for example of the Payment Card Industry Data Security Standards (PCI-DSS), are avoided.

In the known method, a direct data connection between the toll terminal and the transaction terminal at a point of sales (POS) and a further direct data connection between the toll server and transaction server are created in order to allow the two systems to cooperate. A payment transaction is therefore determined at the POS, and, with successful payment processing, a confirmation message is forwarded from the transaction terminal to the toll terminal and from there is transmitted together with an identification, detected there, of the on-board unit to the toll server. The toll server additionally receives via the further direct data connection together with the same confirmation message from the transaction server, a substitute identification generated there. With the aid of the confirmation message received equally by the toll terminal and by the transaction server, the toll server can associate the substitute identification and on-board unit identification with one another. Fees for location usages determined in the road toll system on the basis of the on-board unit identification are charged later via the direct data communication between the toll server and transaction server under the substitute identification.

BRIEF SUMMARY

An object of the present patent application is to further improve the mentioned method, based on the use of payment cards, for charging fees for location usages of on-board units in a road toll system.

This object is achieved in accordance with the present patent application by a method for charging fees for location usages by on-board units in a road toll system by means of a separate payment transaction system, wherein the road toll system has a toll server, at least one toll terminal and at least one sub-system for determining the location usages, and the payment transaction system has a transaction server and at least one transaction terminal for payment cards, said method comprising:

inputting an identification of an on-board unit into the toll terminal, generating an associated transaction identification and transmitting the transaction identification from the toll terminal to the transaction server via a first data connection therebetween;

transmitting the transaction identification from the transaction server to the transaction terminal via a second data connection therebetween;

inputting a card identification of a payment card into the transaction terminal and transmitting the card identification and the transaction identification from the transaction terminal to the transaction server via the second data connection;

transmitting a substitute identification, generated in the transaction server and associated unambiguously with the card identification, and the transaction identification from the transaction server to the toll terminal via the first data connection;

retrieving, in the toll terminal, for the on-board unit identification associated with the transaction identification and transmitting the on-board unit identification and the substitute identification from the toll terminal to the toll server; and using the substitute identification in a communication via a third data connection between the toll server and the transaction server for charging a fee for a location usage determined by the sub-system under the associated on-board unit identification.

The method spares a direct data connection between the toll terminal and transaction terminal at the POS, which involves the risk of harming the data integrity of the payment transaction system: Via such a data connection, which runs exclusively at the POS and is therefore exposed, and the transaction terminal usually equipped with just low intelligence, that is to say low processor power and (software) functionality, the data of the payment transaction system could be contaminated otherwise. The avoidance of a direct data connection between the toll terminal and transaction terminal increases the transaction security and data integrity, even in the event of possible interruptions of the data connections between the road toll system and payment transaction system: specifically, if the payment transaction between the transaction server and transaction terminal were processed completely correctly and were confirmed, but the data connection to the toll terminal were interrupted, either each individual transaction terminal in the payment transaction system would therefore have to be capable of recognising this interruption and again transmitting the confirmation to the toll terminal at a later moment in time (when the data connection to the toll terminal again functions in a manner free from interruptions), or the entire payment transaction would have to be cancelled starting from the transaction terminal and repeated at a later moment in time.

In accordance with the improved method, the transaction server generally equipped with high processor power can now recognise such an interruption to the toll terminal and either prompt a renewed transmission of the substitute identification at a later moment in time or directly and centrally cancel or stop the payment transaction. None of the many transaction terminals therefore requires an adaptation in accordance with this method; adaptations are at best necessary centrally in the transaction server. All transaction terminals are exclusively connected to the transaction server, which increases the security of the payment transaction system against manipulation and the security of the entire method for charging fees for location usages. The entire method can therefore be implemented more quickly and has a greater level of security against manipulations compared to known methods. Contamination of the sensitive payment transaction system and its data is considerably impaired or even impossible; here, a certification of the road toll system in accordance with payment card system standards may be omitted, since there is also no integration to a greater depth of the two systems.

In order to make the method even more efficient, it is advantageous if, when charging a fee for the location usage: at least one toll value is calculated in the road toll system relative to the on-board unit identification; the substitute identification associated with the on-board unit identification is determined in the toll server upon a fee charge request and is transmitted, together with the toll value to the transaction server via the third data connection; and in the transaction server, the card identification associated with the received substitute identification is determined and the toll value is charged on the basis of the determined card identification.

A transaction value may be additionally input into the toll terminal and is also transmitted when the transaction identification is transmitted from the toll terminal to the transaction server and from there further to the transaction terminal. Here, it is not necessary to type such a transaction value into the transaction terminal, which is an elaborate process, but there is the possibility of detection, which is nowadays usually automatic, of the transaction value at the toll terminal. The method is thus further accelerated, and the processing time at the POS is reduced.

In order to further increase the security and traceability of the method, the transaction identification may also be transmitted when the on-board unit identification and the substitute identification are transmitted from the toll terminal to the toll server. The entire part of the transaction detected in the toll system can thus be traced without gaps and completely. In the road toll system, this creates the possibility for immediate checking or, if the data is stored in the toll server, for a subsequent detection of the transaction.

It is particularly favourable if authorisation data is generated in the transaction server and is also transmitted when the substitute identification and the transaction identification are transmitted from the transaction server to the toll terminal and also when the on-board unit identification and the substitute identification are transmitted from the toll terminal to the toll server. This authorisation data may be a release code for the payment transaction on the one hand, but additionally may also be a timestamp of the authorisation, an unambiguous identification of the transaction terminal, etc. The authorisation data in this case contains detailed information concerning the payment transaction and thus also allows the detection of possible faults (potentially uncovered later) with respect to the payment transactions system.

In an example embodiment, person-based and/or vehicle-based data is additionally detected in the toll terminal and is also transmitted when the on-board unit identification and the substitute identification are transmitted from the toll terminal to the toll server. This data allows the road toll system to additionally individualise the charged fees since the fee charges are created on the basis of people and/or vehicles, and also to ensure correct location usages since the location usages by vehicles is checked on the basis of the vehicle identification or other detected person-based and/or vehicle-based data, at least randomly.

It is particularly advantageous if a credit card payment transaction system is used as the payment transaction system. The road toll system in the described method can thus revert to the particularly high flexibility and security of credit card payment transactions, without itself having to carry out the payment transactions, and can advantageously utilise the diffusiveness and international applicability of credit cards.

BRIEF DESCRIPTION OF THE DRAWINGS/FIGURES

Figure 2:
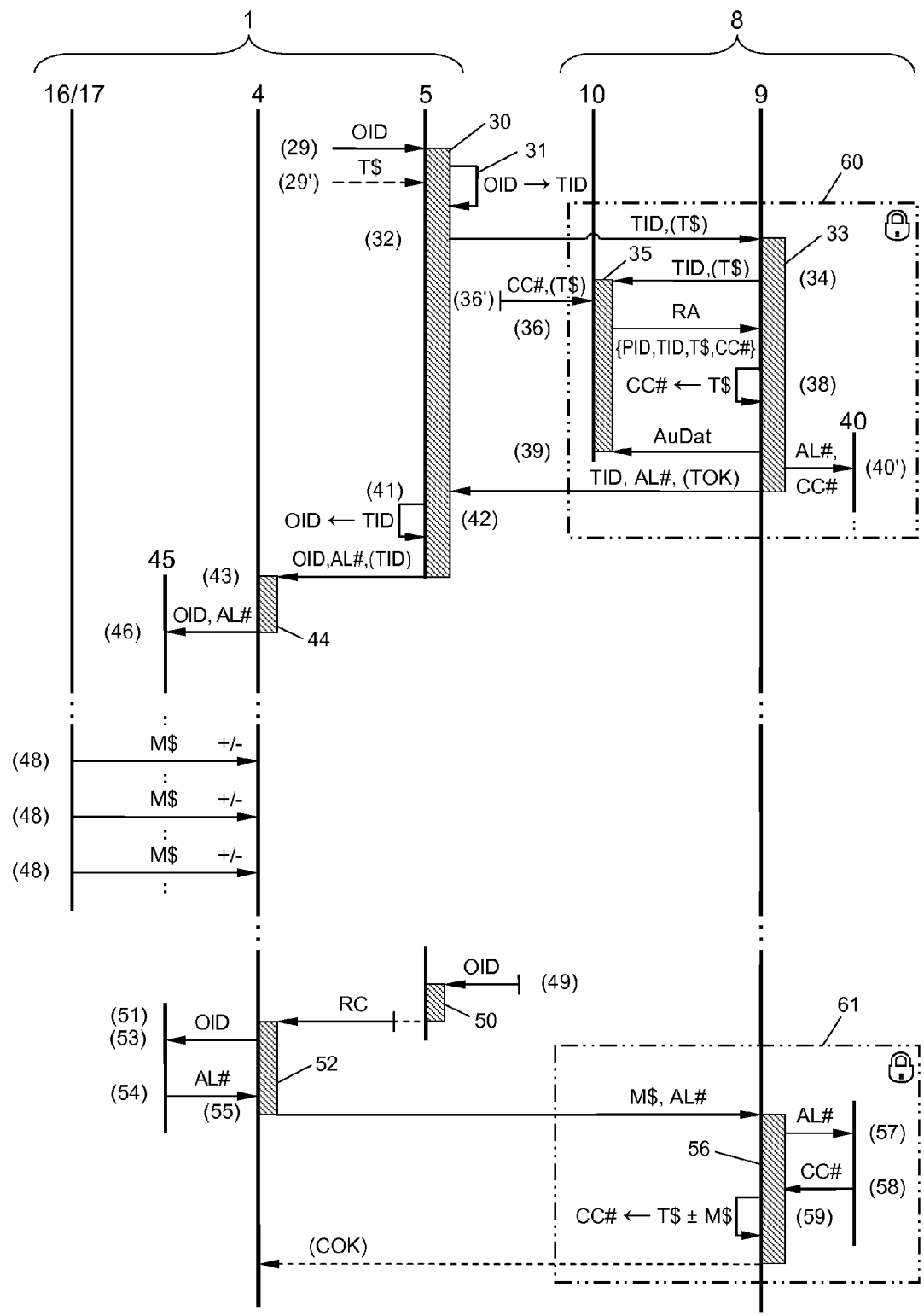

Further features and advantages of the present subject matter will emerge from the following description of a preferred exemplary embodiment with reference to the accompanying drawings, in which:

FIG. 1 schematically shows the physical structure of a road toll system and of a payment transaction system and the cooperation thereof in the method, according to an embodiment; and FIG. 2 shows a sequence diagram of an embodiment of the method, according to an embodiment.

Embodiments will now be described with reference to the accompanying drawings.

DETAILED DESCRIPTION

The present application relates to a method for charging fees for location usages of on-board units in a road toll system by means of a separate payment transaction system, wherein the road toll system has a toll server, at least one toll terminal and at least one sub-system for determining the location usages, and the payment transaction system has a transaction server and at least one transaction terminal for payment cards.

For instance, FIG. 1 shows a road toll system 1 for determining and charging for location usages by vehicles 2, which are moving on roads 3. The road toll system 1 comprises a central toll server 4, which is connected via data connections 6 to a multiplicity of decentralised toll terminals 5, of which one is illustrated symbolically in FIG. 1. The toll terminals 5 are arranged at points of sales 7.

A payment transaction system 8 for charging fees for the location usages by the vehicles 2 comprises a central transaction server 9, which is connected to a multiplicity of decentralised transaction terminals 10, of which one is again illustrated symbolically in FIG. 1, via direct data connections 11 (also referred to hereinafter as "second data connections"). The transaction terminals 10 are also arranged, similarly to the toll terminals 5, at or in points of sales 7

(POS) and are each associated with one or more toll terminals 5, without being directly interconnected, however.

The payment transaction system 8 is a secured transaction system based on payment cards 12, such as credit cards, debit cards or prepaid cards, with which the payment transaction takes place in an online method by means of communication between the transaction server 9 and the respective transaction terminal 10, which for this purpose has an unambiguous transaction terminal identification PID. A payment card 12 in turn has an unambiguous identification CC# and optionally a user code PIN.

The payment transaction system 8 is designed and certified in accordance with the most stringent data security regulations and standards, such as the Payment Card Industry Data Security Standard (PCI-DSS), the Visa® Account Information Security Program (AIS and its sister program CISP), the MasterCard® Site Data Protection Program (SDP), the American Express® Security Operating Policy (DSOP), the Discover Information Security and Compliance (DISC) or the JCB® security rules and also comparable payment transaction methods, for example also with use of the Maestro® Secure Code or the MasterCard® Secure Code™.

Each toll terminal 5 is connected to the transaction server 9, in each case via a direct data connection 13 (also referred to hereinafter as the "first data connection"). Here, a toll terminal 5 is used above all as an input point for data intended for the toll server 4, and forwards data that it has received from the transaction server 9 to the toll server 4. As illustrated in FIG. 1, the toll terminal 5 can be formed for example as a till system in a toll point or stop point, for example at borders between countries or at filling stations. The transaction terminal 10 serves as a local user interface for the payment transaction and can be equipped with a card reader for the payment card 12 and a simple keyboard for data input. Points of sales 7 having both terminals 5 and 10 may also be formed by integrated automatons 14 for self-operation (not illustrated in FIG. 1).

A data connection 15 (also referred to hereinafter as the "third data connection") exists between the transaction server 9 and the toll server 4 for direct data exchange therebetween, as will be described further below in greater detail. The transaction server 9 and also the toll server 4 here are not to be interpreted necessarily as individual, self-contained processor units, but may be parts of processor units of this type or parts of server farms, which may possibly be geographically distributed, or may also be parts of other processor systems, for example in a credit institute or belonging to a road operator.

The data connections 6, 11, 13 and 15 may be formed in the manner of wired lines, possibly with proprietary data transmission protocols, internet connections (for example in the form of a virtual private network VPN) or as wireless connections, for example mobile radio, but may also be satellite-assisted, wherein they exist permanently or can be set up as required (for example by means of dial-up modems, as packet-switched data sessions, etc.). Any combination of connection types is also possible, and therefore remote, seldom-used toll or transaction terminals 5, 10 form dial-up connections for example, whereas toll or transaction terminals 5, 10 at heavily frequented locations can be connected permanently to the toll and transaction servers 4, 9.

The toll server 4 is connected to sub-systems 16, 17 in order to determine the location usages by vehicles 2, the sub-systems 16, 17 likewise being parts of the road toll system 1. The data connections 18 used for this purpose can be formed in various ways, as described in conjunction with the data connections 6, 11, 13, 15.

A first exemplary sub-system is the sub-system 16, which has geographically distributed dedicated short range communication beacons (DSRC beacons) 19 with local processor units 20. If an on-board unit (OBU) 21 carried by a vehicle 2 enters the radio range 22 of a DSRC beacon 19, this DSRC beacon 19 and the OBU 21 establish a communication connection 23. At this communication connection 23, the use by the vehicle 2 of the portion or location of the road 3 located in the radio range 22 of the DSRC beacon 19 is recognised. All known dedicated short range connections, such as infrared connections RFID, WAVE (Wireless Access in Vehicular Environments), ITS-G5, WLAN (Wireless Local Area Network), Wi-Fi®, Bluetooth®, etc., are suitable as a communication connection 23.

The location usage is determined here in the road toll system 1 on the basis of any unambiguous on-board unit or OBU identification OID associated with the OBU 21 and transmitted to the DSRC beacon 19 within the scope of the communication connection 23. The DSRC beacons 19 transmit the data determined in the communication connections 23, for example together with unambiguous beacon identifications BID of the DSRC beacons 19, to the toll server 4 via the data connections 18.

A second exemplary sub-system is the sub-system 17, which determines the location usages of the vehicles 2 with the aid of OBUs 24, which self-locate themselves in a global satellite navigation system 25. The OBUs 24 communicate via a radio link 26 with a radio network 27, which transmits the determined location usages via the data connection 18 to the central toll server 4. The radio link 26 and the radio network 27 may be a cellular mobile radio network or other type of network. Alternatively, this connection can also be formed however via one of the dedicated short range communication links 23 and DSRC beacons 19 or other suitable radio networks connected to the toll server 4.

Location usages by vehicles 2, which are determined and charged in the road toll system 1, may be of any nature, whether travel over a toll road, such as the road 3 or a portion thereof, the pulling into a specific area (inner city areas, national parks, tunnels etc.), or the residence in an area, such as the parking space 28, etc. The toll to be charged for the location usage may be based on travelled distances (route toll) and/or on period of use (time toll).

FIG. 2 shows the method for charging fees for location usages of the vehicles 2 or OBUs 21, 24 in detail. The method starts with the input of an on-board unit identification OID in step 29 and of a transaction value T$ in step 29' into one of the toll terminals 5, which triggers a process 30 therein. The transaction value T$ is used, for example, as prepayment for a toll to be charged for later and, for example, may also include a security (deposit) for the OBU 21, 24. Alternatively, the transaction value T$ could also be just one symbolic amount, for example 1 Eurocent, so as to trigger a transaction in the first place. The transaction value T$ can be fixed freely here in step 29' and input manually, can be predetermined as a fixed value, or can be selected from a prefabricated list in the toll terminal 5.

The sequence of steps 29 and 29' is arbitrary. The process 30 serves to capture and collect the information of the transaction necessary for the method from the viewpoint of the road toll system 1 and to forward said information to the toll server 4.

In step 31, an unambiguous transaction identification TID is generated in the toll terminal for the on-board unit identification OID. The transaction identification TID may be a continuous number, optionally supplemented by date, time and/or an identification MID of the toll terminal 5. The transaction identification TID, for plausibility purposes, may also contain parts of the on-board unit identification OID; the on-board unit identification OID may not be derived however from the mere knowledge of the transaction identification TID in an embodiment.

In step 32, the transaction identification TID is transmitted with the transaction value T$ via the first connection 13 to the transaction server 9 in order to initiate a payment transaction process 33 therein. In this process 33, the transaction identification TID together with the transaction value T$ is first transmitted from the transaction server 9 via the second data connection 11 to the transaction terminal 10 (step 34). There, an authorisation process 35 is thus started, in which the transaction terminal 10 is ready to capture the card identification CC# of a payment card 12, for example by reading in the payment card 12 at a card reader of the transaction terminal 10 (step 36'). Alternatively or additionally to step 29', the transaction value T$ could also be input directly at the transaction terminal 10 in step 36', in which case the input and joint transmission of the transaction value T$ in steps 29', 32 and 34 can be spared. Optionally, depending on the used payment transaction system 8, a user code PIN and additional information, for example user-based information, may also be input at the transaction terminal 10.

The order of the input of card identification CC# and optionally transaction value T$, user code PIN and further data at the transaction terminal 10 is arbitrary and is generally predefined by the payment transaction system 8.

If all data necessary for a payment transaction is captured in the transaction terminal 10, said terminal transmits an authorisation request RA, optionally after acknowledgement, to the transaction server 9 (step 36). The authorisation request RA contains the identification of the transaction terminal PID, the transaction identification TID, the transaction value T$, the card identification CC# and optionally the user code PIN and further user data.

With the receipt of the authorisation request RA {PID, TID, T$, CC#}, the authorisation of the payment transaction and generation of a substitute identification AL# for the card identification CC# are started in the payment transaction process 33. To this end, the transaction server 9 checks, on the basis of the data received in step 36 with the authorisation request RA, the validity of the payment transaction. The exact course of the validation process can be inferred from known art for the used payment transaction system 8; here, the transaction server 9 may request, for example, a card account 37 managed thereby and associated with the respective payment card 12 (FIG. 1), symbolised as step 38, or alternatively may allow the payment transaction to be validated and authorised from an external point, for example by a credit card operator. step 38 may also be carried out at a later moment in time in the process 33 or even after conclusion thereof.

Following positive checking and/or validation, the transaction server 9, as authorisation for the payment transaction (step 39), sends authorisation data AuDat back to the transaction terminal 10, which thereby terminates its authorisation process 35 in a known manner, for example with output of customer receipt. The authorisation data AuDat are unique for each payment transaction. For example, they may contain for this purpose a time stamp of the transaction, the identification PID of the used transaction terminal 10 and/or a digital certificate of the transaction server 9, as known in the art.

The substitute identification AL#, generated in the process 33, of the card identification CC# is associated unambiguously therewith and is stored in step 40' in a database 40 of the transaction server 9 for subsequent use. The card identification CC# cannot be derived from the mere knowledge of the substitute identification AL#, but may contain parts of the card identification CC# however, for example the last four numbers thereof, for validation purposes.

In step 41, which could also be carried out before step 40', the transaction server 9 transmits the substitute identification AL# and an optional confirmation message TOK ("transaction OK") under the transaction identification TID to the toll terminal 5, which, in the example of FIG. 2, terminates the process 33. If desired, the transaction server 9 here may also transmit the authorisation data AuDat to the toll terminal 5. The toll terminal 5 then retrieves the respective on-board unit identification OID on the basis of the received transaction identification TID (step 42).

To end the process 30, the on-board unit identification OID and the substitute identification AL# are transmitted in step 43 from the toll terminal 5 via the data connection 6 to the toll server 4, which terminates the process 30 in the toll terminal 5. For immediate checking or for subsequent proof of the payment transaction, the transaction identification TID and/or possibly the authorisation data AuDat, and also any possible further information, for example the transaction value T$ and further person-based and/or vehicle-based data captured during the process 30 at the toll terminal 5, may additionally also be transmitted in step 43.

The toll server 4 then stores the associated identifications OID AL# in a database 45 of the toll server 4 in a process 44 for further use in the fee charging process (step 46). For subsequent proof, the toll server 4 in step 46 could also store the additional information, optionally received, in step 43, that is to say the transaction identification TID, where applicable the authorisation data AuDat, and for example the transaction value T$ and/or person-based and/or vehicle-based data.

The toll server 4 then uses the substitute identification AL# and/or the on-board unit identification OID to manage or identify a person-based and/or vehicle-based toll account 47 in order to charge toll transactions in the road toll system 1. FIG. 2 shows some exemplary toll transactions 48, which are triggered by the sub-systems 16, 17, in order to determine location usages by vehicles 2 and to generate therefrom toll-relevant data, what are known as "toll values" M$, for the toll server 4. The toll values M$, depending on the architecture of the road toll system 1, may be the specification of individual location usages, for example in the form of an on-board unit identification OID together with a beacon identification BID, or may also be finished individual or cumulative toll calculation results or a mixture of these variants, and can be transmitted both from the DSRC beacons 19 and from the self-locating OBUs 24 via the radio network 27, in each case under an on-board unit identification OID, to the toll server 4. The toll server 4 debits (or credits) the toll account 47 associated with the on-board unit identification OID with the toll value or toll values M$.

For subsequent charging of fees for the location usages by a vehicle 2 via the payment transaction system 8, a user, in step 49, returns the OBU 21 or 24 carried in the vehicle 2 at any point of sales 7, for example, whereby (or wherein) the toll terminal 5 is notified again of the on-board unit identification OID (process 50). The toll terminal 5 then, in step 51, transmits a fee charge request RC to the toll server 4. A fee charge request RC may of course also be implemented without return of an OBU 21, 24, for example if two OBUs 21, 24 are exchanged or if the on-board unit identification OID is simply input into the toll terminal 5. The request could additionally also be generated directly in the toll server 4 with the occurrence of specific events, for example at the end of a month for monthly charging, in which case steps 49 to 51 are omitted.

In a following process 52 triggered by the fee charge request RC, the toll server 4 then determines the substitute identification AL# associated with the on-board unit identification OID from the database 45, see steps 53 and 54. In step 55, the toll server 4 then transmits the toll value(s) M$ or toll transactions 48 (or a toll value M$ accumulated therefrom in the toll account 47) under the substitute identification AL# via the third data connection 15 to the transaction server 9 and terminates the process 52 and in doing so also closes the respective toll account 47 where appropriate. The additional transmission of further data in step 55, for example of the authorisation data AuDat for additional assurance of the authenticity, is likewise possible here.

The transaction server 9 then performs the charging process on the basis of the payment card 12 or the card identification CC# thereof. Here, both a credit note and a debit note can be settled with the payment card 12. After receiving the toll value(s) M$ and the substitute identification AL# from the toll server 4 in step 55, the transaction server 9 firstly determines from the database 40 the card identification CC# belonging to the substitute identification AL# in a process 56, see steps 57 and 58. The toll value(s) M$ is/are then debited from or credited to the card account 37 having the card identification CC# in step 59, or is/are charged at the external point, which terminates the process of charging fees for the location usages. Optionally, a confirmation message COK ("charge OK") of the charging process performed in step 55 by the transaction server 9 can be produced thereby via the third data connection 15 to the toll server 4.

As symbolised by the blocks 60 and 61 in FIG. 2, the payment transaction system 8 is a secured payment transaction system 8. The contact points of the road toll system 1 with the secured payment transaction system 8 are limited to a minimum: only in step 55 of transmitting the calculated toll value M$ and the substitute identification AL# to the transaction server 9 is there a data transmission between the toll server 4 and transaction server 9; and only at the start and at the end of the payment transaction process 33 is a data exchange implemented between the toll terminal 5 and transaction server 9 as a result of transmission (step 32) of the transaction identification TID and (optionally) of the transaction value T$ or transmission (step 41) of the transaction identification TID and the substitute identification AL#.

CONCLUSION

The invention is not limited to the presented embodiments, but includes all variants and modifications that lie within the scope of the accompanying claims. While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the described embodiments should not be limited by any of the above-described exemplary embodiments, but should be defined only in accordance with the following claims and their equivalents.

What is claimed is:

1. A computer implemented method for charging fees for location usages by on-board units that are carried in vehicles in a road toll system by means of a separate payment transaction system, wherein the road toll system has a toll server, at least one toll terminal and at least one sub-system for determining the location usages, and the payment transaction system has a transaction server and at least one transaction terminal for payment cards, said method comprising:

inputting an identification of an on-board unit, configured to communicate via dedicated short range communication (DSRC) and/or to be self-locating via a global navigation satellite system (GNSS), into the toll terminal, generating a respective transaction identification and transmitting the transaction identification from the toll terminal to the transaction server via a first data connection therebetween;

transmitting the transaction identification from the transaction server to the transaction terminal via a second data connection therebetween;

inputting a card identification of a payment card into the transaction terminal and transmitting the card identification and the transaction identification from the transaction terminal to the transaction server via the second data connection;

transmitting a substitute identification, generated by the transaction server and unambiguously associated with the card identification, and the transaction identification from the transaction server to the toll terminal via the first data connection;

retrieving, by the toll terminal, the on-board unit identification associated with the transaction identification and transmitting the on-board unit identification and the substitute identification from the toll terminal to the toll server; and using the substitute identification in a communication via a third data connection between the toll server and the transaction server for charging a fee for a location usage determined by the sub-system under the respective on-board unit identification.

2. The computer implemented method according to claim 1, wherein, when charging a fee for the location usage, at least one toll value is calculated in the toll road system relative to the on-board unit identification;

in the toll server, the substitute identification associated with the on-board unit identification is determined in the event of a fee charge request and is transmitted, together with the toll value, to the transaction server via the third data connection; and in the transaction server, the card identification associated with the received substitute identification is determined and the toll value is charged on the basis of the determined card identification.

3. The computer implemented method according to claim 1, wherein a transaction value is additionally input into the toll terminal and is additionally transmitted when the transaction identification is transmitted from the toll terminal to the transaction server, and from the transaction server further to the transaction terminal.

4. The computer implemented method according to claim 1, wherein the transaction identification is additionally transmitted when the on-board unit identification and the substitute identification are transmitted from the toll terminal to the toll server.

5. The computer implemented method according to claim 1, wherein authorisation data is generated in the transaction server and is also transmitted when the substitute identification and the transaction identification are transmitted from the transaction server to the toll terminal.

6. The computer implemented method according to claim 5, wherein the authorisation data is also transmitted when the on-board unit identification and the substitute identification are transmitted from the toll terminal to the toll server.

7. The computer implemented method according to claim 1, wherein person-based and/or vehicle-based data is additionally captured in the toll terminal and is also transmitted when the on-board unit identification and the substitute identification are transmitted from the toll terminal to the toll server.

8. The computer implemented method according to claim 1, wherein a credit card payment transaction system is used as the payment transaction system.

* * * * *